United States Patent
Sakakibara et al.

(10) Patent No.: US 12,122,863 B2
(45) Date of Patent: Oct. 22, 2024

(54) FLUOROPLASTIC PELLETS, ELECTRIC WIRE, AND METHOD FOR PRODUCING SAME

(71) Applicant: DAIKIN INDUSTRIES, LTD., Osaka (JP)

(72) Inventors: Shingo Sakakibara, Osaka (JP); Jihong Liu, Osaka (JP); Yoshiyuki Takase, Osaka (JP); Ryouichi Fukagawa, Osaka (JP); Yosuke Shojima, Osaka (JP); Yukari Karasawa, Osaka (JP); Takeshi Shimono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 762 days.

(21) Appl. No.: 16/061,512

(22) PCT Filed: Jan. 17, 2017

(86) PCT No.: PCT/JP2017/001404
§ 371 (c)(1),
(2) Date: Jun. 12, 2018

(87) PCT Pub. No.: WO2017/126499
PCT Pub. Date: Jul. 27, 2017

(65) Prior Publication Data
US 2020/0262952 A1  Aug. 20, 2020

(30) Foreign Application Priority Data
Jan. 18, 2016  (JP) ................................ 2016-007360

(51) Int. Cl.
*C08F 214/28*  (2006.01)
*B29C 48/06*  (2019.01)
(Continued)

(52) U.S. Cl.
CPC .......... *C08F 214/282* (2013.01); *B29C 48/06* (2019.02); *B29C 48/154* (2019.02); *H01B 13/147* (2013.01); *B29L 2031/3406* (2013.01)

(58) Field of Classification Search
CPC ... C08F 214/282; B29C 48/06; B29C 48/154; B29C 48/34; H01B 13/147
See application file for complete search history.

(56) References Cited

U.S. PATENT DOCUMENTS 5,265,507 A * 11/1993 Noda ..................... B29B 9/06
264/143
2009/0044965 A1   2/2009 Kono et al.
(Continued)

FOREIGN PATENT DOCUMENTS

CN   101163739 A   4/2008
EP   0 413 255 A2   2/1991
(Continued)

OTHER PUBLICATIONS

Translation of International Preliminary Report on Patentability and Translation of Written Opinion, dated Jul. 24, 2018 from the International Bureau in counterpart International application No. PCT/JP2017/001404.
(Continued)

*Primary Examiner* — Jeremy R Pierce
(74) *Attorney, Agent, or Firm* — Sughrue Mion, PLLC (57) ABSTRACT

The invention provides novel pellets having high fluidity in a hopper of an extruder and capable of forming a coating layer having good wire diameter stability and capacitance stability even when used for rapid molding of electric wire coating. The pellets contain a fluororesin. Each of the pellets, placed on a horizontal surface, has a substantially circular outline or a substantially elliptic outline and has a major axis $D_1$ of 3.1 mm or shorter and a minor axis $D_2$ of 3.1 mm or shorter when observed in the direction normal to
(Continued)

the horizontal surface. Each pellet satisfies the following formula (1): $(D_1+D_2)/2L=1.8$ to $2.6$, wherein $D_1$ represents the major axis, $D_2$ represents the minor axis, and L represents the height from the horizontal surface to the highest point of the pellet.

8 Claims, 4 Drawing Sheets

(51) Int. Cl.
  *B29C 48/154* (2019.01)
  *H01B 13/14* (2006.01)
  *B29L 31/34* (2006.01)

(56) References Cited

U.S. PATENT DOCUMENTS

| | | | |
|---|---|---|---|
| 2013/0230645 A1* | 9/2013 | Kitahara | B29B 9/16 427/117 |
| 2014/0080933 A1 | 3/2014 | Abe et al. | |
| 2014/0121331 A1 | 5/2014 | Otsugu et al. | |

FOREIGN PATENT DOCUMENTS

| | | | | |
|---|---|---|---|---|
| JP | 3-122919 A | 5/1991 | | |
| JP | 3-233815 A | 10/1991 | | |
| JP | 2001-113541 A | * | 4/2001 | ............... B29B 9/12 |
| JP | 4068755 B2 | * | 3/2008 | ............... B29B 9/06 |
| JP | 4394362 B2 | * | 1/2010 | ............... B29B 9/06 |
| JP | 2011-514407 A | | 5/2011 | |
| WO | 2009/102660 A1 | | 8/2009 | |
| WO | 2013/005743 A1 | | 1/2013 | |

OTHER PUBLICATIONS

International Search Report for PCT/JP2017/001404 dated Mar. 7, 2017.

Extended European Search Report dated Jun. 26, 2019 issued by the European Patent Office in counterpart EP application No. 17741377.0.

Extended European Search Report dated Apr. 26, 2021, issued by the European Patent Office in application No. 21150203.4.

* cited by examiner

FLUOROPLASTIC PELLETS, ELECTRIC WIRE, AND METHOD FOR PRODUCING SAME

CROSS REFERENCE TO RELATED APPLICATIONS

This application is a National Stage of International Application No. PCT/JP2017/001404 filed Jan. 17, 2017, claiming priority based on Japanese Patent Application No. 2016-007360 filed Jan. 18, 2016.

TECHNICAL FIELD

The invention relates to fluororesin pellets. The invention also relates to electric wires formed using the pellets, and methods for producing electric wires using the pellets.

BACKGROUND ART

Fluororesin pellets are used in many cases as materials for producing molded articles of a fluororesin in terms of handleability.

Patent Literature 1 aims to provide a method for producing an insulated thin electric wire. This method enables insulated extrusion and coating with a very low amount of a material attached. In this method, the pellets have a size of 1.5 mm or smaller and the extruder has a screw outer diameter of 20 mm or smaller.

Patent Literature 2 discloses cylindrical or elliptic cylindrical mini-pellets of a tetrafluoroethylene/perfluoroalkyl vinyl ether copolymer (PEA) which is a resin material for rotational molding. This material may suffer no metal contamination and can be sufficient in terms of the quality and performance of rotationally molded articles. These mini-pellets satisfy all of the following equations:

$D_1$=0.3 to 1.5, $D_2$=0.3 to 1.5, $L$=0.3 to 2.0, and $2L/(D_1+D_2)$=0.5 to 5, wherein $D_1$ represents the minor axis (mm), $D_2$ represents the major axis (mm), and L represents the length (mm).

Patent Literature 3 discloses that fluororesin pellets are adjusted to have an average particle size of 1.0 to 5.0 mm in consideration of the handleability during production of fluororesin molded articles using fluororesin pellets.

CITATION LIST

Patent Literature

Patent Literature 1: JP H03-122919 A
Patent Literature 2: JP 2001-113541 A
Patent Literature 3: WO 2013/005743

SUMMARY OF INVENTION

Technical Problem

Current downsizing of electronic devices promotes thinning of electric wires, and electric wire coating materials are required to have moldability into small-diameter electric wires and moldability into thin-wall electric wires. In molding of thin-wall electric wires, a slight variation in diameter of electric wires during molding inevitably affects the final physical properties of electric wires. Thus, the molding needs to be more stable than ever. Electric wire coating materials are also required to have better wire diameter stability and capacitance stability than conventional materials.

In production of electric wires including a fluororesin coating layer, fluororesin pellets are fed into a cylinder of an extruder from a hopper and molten in the cylinder, and then the molten fluororesin is extruded through a die onto a core wire that is delivered from the back of the die, whereby a coating layer is formed.

Unfortunately, conventional pellets need to be improved in terms of fluidity in a hopper. In addition, it was found that a coating layer formed from conventional pellets on a core wire that is rapidly delivered has insufficient wire diameter stability and capacitance stability.

In consideration of the above state of the art, the invention aims to provide novel pellets exhibiting high fluidity in a hopper of an extruder and are capable of forming a coating layer having good wire diameter stability and capacitance stability even when used for rapid molding of electric wire coating.

Solution to Problem

The inventors studied solutions to the above problems, and found that the shapes of pellets have a great influence on the wire diameter stability and capacitance stability of a coating layer of an electric wire. Thereby, the inventors have completed the invention. The inventors also have found that the shapes of pellets achieving good wire diameter stability and capacitance stability also improve the fluidity of pellets in a hopper of an extruder.

The invention relates to pellets containing a fluororesin, each of the pellets, placed on a horizontal surface, having a substantially circular outline or a substantially elliptic outline and having a major axis $D_1$ of 3.1 mm or shorter and a minor axis $D_2$ of 3.1 mm or shorter when observed in the direction normal to the horizontal surface, and satisfying the following formula (1):

$(D_1+D_2)/2L$=1.8 to 2.6 wherein $D_1$ represents the major axis, $D_2$ represents the minor axis, and L represents the height from the horizontal surface to the highest point of the pellet.

The pellets preferably satisfy that the major axis $D_1$ is 1.6 mm or longer and the minor axis $D_2$ is 1.6 mm or longer.

The pellets preferably satisfy that the heights L have a standard deviation of 0.3 mm or smaller.

The pellets preferably include not more than 100 pellets having an irregular shape for each 100 g of the pellets.

The pellets preferably include 10 mass % or less of pellets containing bubbles therein for each 100 g of the pellets.

Preferably, 300 g of the pellets are discharged within 9.2 seconds in a pellet fluidity test.

Each pellet preferably has a substantially spheroidal shape, a substantially cylindrical shape, or a substantially elliptic cylindrical shape.

The fluororesin preferably contains 120 or less groups in total selected from —COOH, —COOCH$_3$, —CH$_2$OH, —COF, —CONH$_2$, and —CF$_2$H for each $1\times10^6$ carbon atoms.

The invention also relates to an electric wire including a core wire and a coating layer disposed around the core wire and formed from the pellets.

The invention also relates to a method for producing an electric wire including a core wire and a coating layer using an extruder provided with a cylinder, a screw contained in the cylinder, a die attached to a tip of the cylinder, and a hopper configured to feed pellets into the cylinder. The method includes: preparing the pellets; pouring the pellets into the hopper; feeding the pellets from the hopper into the cylinder; melting the pellets in the cylinder to form a molten fluororesin; and extruding the molten fluororesin through the die to form the coating layer on the core wire.

Advantageous Effects of Invention

The pellets of the invention have the aforementioned configuration, and thus have excellent fluidity in a hopper of an extruder. Use of the pellets of the invention as material for coating an electric wire enables production of an electric wire that includes a coating layer having good wire diameter stability and capacitance stability at high productivity.

The electric wire of the invention has the aforementioned configuration, and thus has excellent wire diameter stability and capacitance stability.

The method for producing an electric wire of the invention has the aforementioned configuration, and thus enables production of an electric wire having excellent wire diameter stability and capacitance stability at high productivity.

DESCRIPTION OF EMBODIMENTS

The invention will be specifically described hereinbelow.

The pellets of the invention, placed on a horizontal surface, each have a substantially circular outline or a substantially elliptic outline and have a major axis $D_1$ of 3.1 mm or shorter and a minor axis $D_2$ of 3.1 mm or shorter when observed in the direction normal to the horizontal surface, and satisfy the following formula (1):

$(D_1+D_2)/2L=1.8$ to 2.6 wherein $D_1$ represents the major axis, $D_2$ represents the minor axis, and L represents the height from the horizontal surface to the highest point of the pellet.

Figure 1:
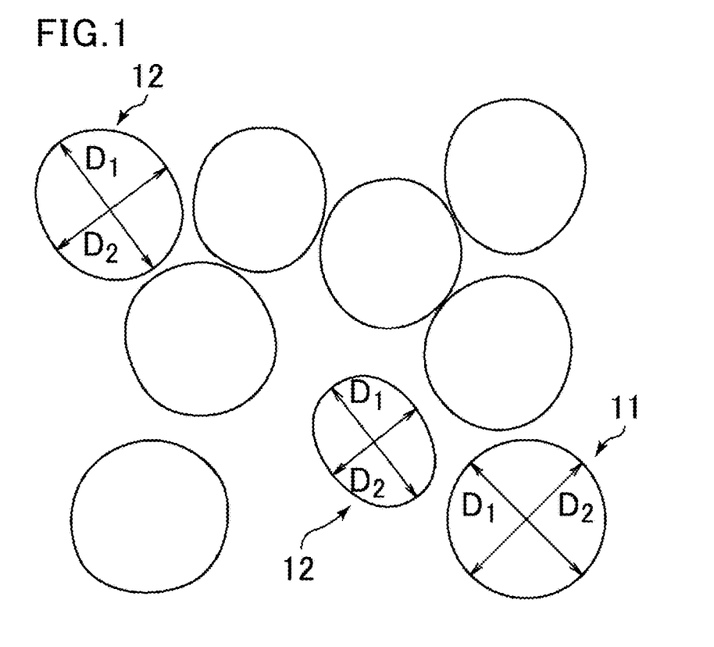
FIG. 1 is a schematic view of an example of the pellets of the invention.
Figure 4:
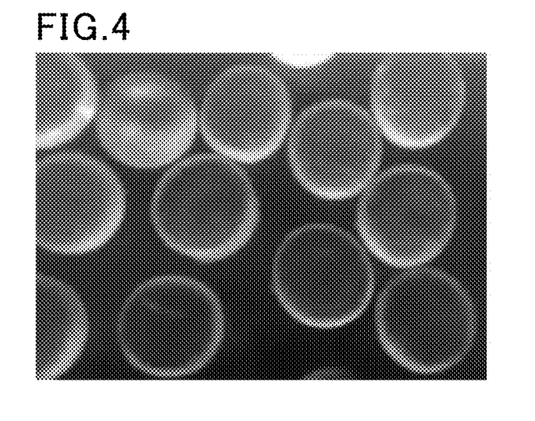
FIG. 4 is a picture of the pellets of the invention.
Figure 6:
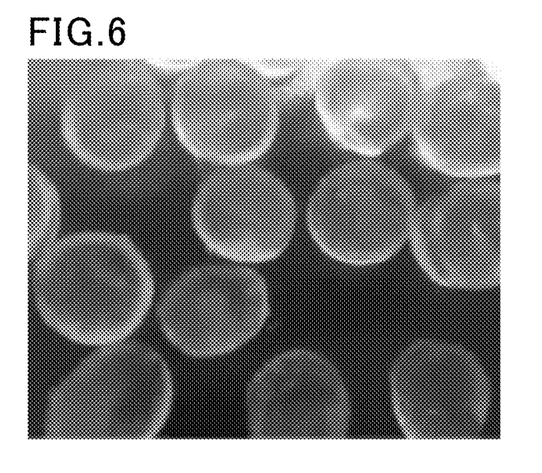
FIG. 6 is a picture of the pellets of the invention.

FIG. 1 is a schematic view of the pellets placed on a horizontal surface and observed in the direction normal to the horizontal surface. FIG. 4 and FIG. 6 are pictures of the pellets of the invention placed on a horizontal surface taken in the direction normal to the horizontal surface. As shown in FIG. 1, the pellets include a pellet 11 having a substantially circular outline and pellets 12 each having a substantially elliptic outline.

The major axis $D_1$ and the minor axis $D_2$ are as shown in FIG. 1. For those having a substantially circular outline such as the pellet 11, the major axis $D_1$ and the minor axis $D_2$ are the same length. Even when the lengths thereof are the same, the terms "major axis" and "minor axis" are used herein as a matter of convenience.

The major axis $D_1$ and the minor axis $D_2$ can be determined by randomly selecting 20 g of pellets, placing them on a horizontal surface, measuring the major axis and minor axis of each pellet, and averaging the values;

The above measurement needs to be performed such that the pellets are placed in such a manner that they neither roll nor fall even on a solid, smooth horizontal surface. For example, when the whole shape of a pellet is a substantially cylindrical shape and the pellet is placed on a horizontal surface with a side thereof in contact with the surface, it may stop moving. Still, the pellet will roll or fall when a weak vibration is applied. Such a manner of placement is inappropriate and the pellets need to be placed in a stable manner before the measurement. For example, when the pellets each have a substantially cylindrical shape, the pellets may be poured into a stainless steel vat and a strong vibration may be applied to the vat, so that all the pellets are brought into contact with the surface by their bottoms and are placed in a stable manner, and subsequently the measurement may be performed.

Such a manner of placement of the pellets also applies to measurement of the height L to be mentioned later.

The pellets each have a major axis $D_1$ of 3.1 mm or shorter and a minor axis $D_2$ of 3.1 mm or shorter. The major axis $D_1$ is preferably shorter than 3.1 mm, more preferably 3.0 mm or shorter, while preferably 1.6 mm or longer, more preferably 1.7 mm or longer. The minor axis $D_2$ is preferably shorter than 3.1 mm, more preferably 3.0 mm or shorter, while preferably 1.6 mm or longer, more preferably 1.7 mm or longer. The pellets each having a major axis $D_1$ and a minor axis $D_2$ within the above respective ranges can have much better fluidity, and can provide an electric wire that includes a coating layer having much better wire diameter stability and capacitance stability at much higher productivity.

Figure 2:
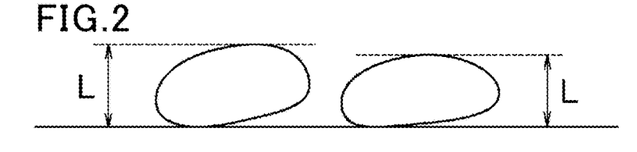
FIG. 2 is a schematic view of an example of the pellets of the invention.
Figure 3:
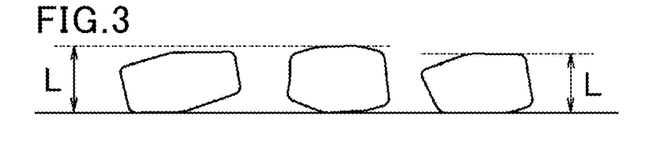
FIG. 3 is a schematic view of an example of the pellets of the invention.
Figure 5:
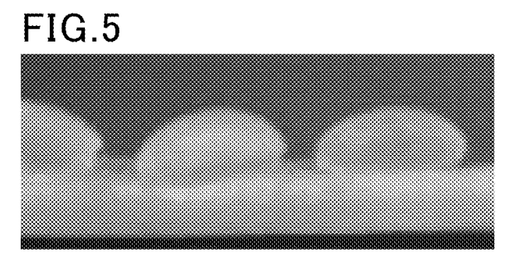
FIG. 5 is a picture of the pellets of the invention.
Figure 7:
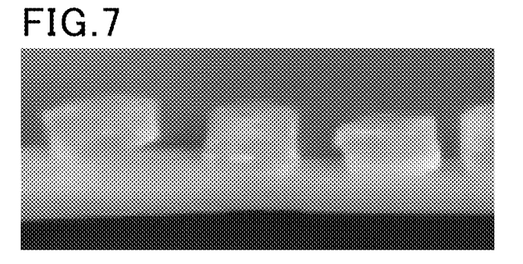
FIG. 7 is a picture of the pellets of the invention.
Figure 8:
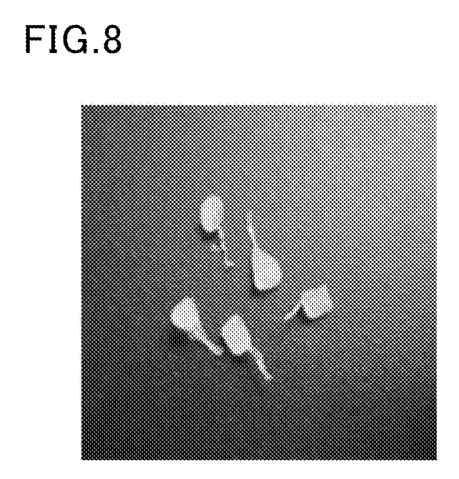
FIG. 8 is a picture of pellets each having an irregular shape.
Figure 9:
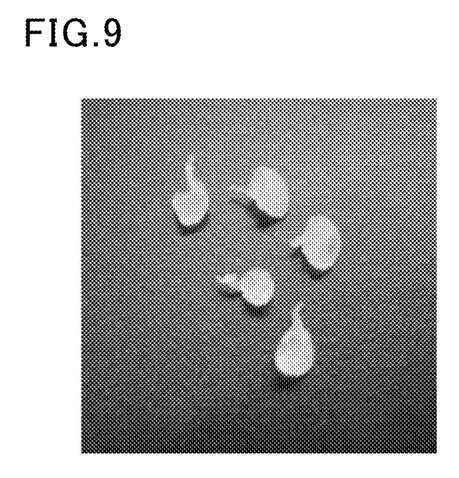
FIG. 9 is a picture of pellets each having an irregular shape.

FIG. 2 and FIG. 3 are schematic views of the pellets placed on a horizontal surface and observed in the horizontal direction. FIG. 5 and FIG. 7 are pictures of the pellets of the invention placed on a horizontal surface taken in the horizontal direction.

Each pellet may have any outline observed in the horizontal direction, and may have a substantially elliptic shape as shown in FIG. 2 or may have a substantially rectangular or trapezoidal shape as shown in FIG. 3. Still, as mentioned later, since each pellet satisfies the above formula (1), the length (width) in the horizontal direction is necessarily greater than the height.

As shown in FIG. 2 and FIG. 3, the height L refers to the length from the horizontal surface to the highest point. Similar to the case of the major axis $D_1$ and minor axis $D_2$, the height L can be determined by randomly selecting 20 g of pellets, placing them on a horizontal surface, measuring the height L of each pellet, and averaging the values. A suitable numerical range of the height L is automatically determined from the formula (1) to be mentioned later.

The pellets preferably satisfy that the heights L have a standard deviation of 0.3 mm or smaller. The standard deviation is more preferably 0.2 mm or smaller. The standard deviation can be calculated from the measurement results obtained by randomly selecting 20 g of pellets, placing them on a horizontal surface, and measuring the height L of each pellet.

The pellets characteristically satisfy the following formula (1):

$$(D_1+D_2)/2L=1.8 \text{ to } 2.6$$

wherein $D_1$ represents the major axis, $D_2$ represents the minor axis, and L represents the height of the pellet. Since the pellets are flat to the extent that they satisfy the formula (1), the pellets have excellent fluidity and are suitable as an electric wire coating material for producing a coating layer having excellent wire diameter stability and capacitance stability at high productivity. The upper limit of $(D_1+D_2)/2L$ is preferably 2.4, while the lower limit thereof is preferably 2.0.

The whole shape of each pellet may be a substantially spheroidal shape, a substantially cylindrical shape, or a substantially elliptic cylindrical shape. Preferably, not less than 97 g out of 100 g of the pellets randomly selected have any of these shapes.

The pellets preferably satisfy that in a pellet fluidity test, 300 g of the pellets are discharged within 9.2 seconds, more preferably within 8.9 seconds. The pellets having high fluidity to the extent that 300 g of the pellets are discharged within 9.2 seconds, preferably within 8.9 seconds, can provide a coating layer having much better wire diameter stability and capacitance stability at much higher productivity. The pellet fluidity test will be described in detail below in the section of EXAMPLES.

The pellets of the invention are fluororesin pellets.

The fluororesin may contain an end group such as —$CF_3$ or —$CF_2H$ in at least one of the polymer main chain or a polymer side chain and may be any one, and is preferably a fluorinated one. A non-fluorinated fluororesin may contain a thermally and electrically unstable end group (hereinafter, such an end group is also referred to as an "unstable end group") such as —COOH, —$COOCH_3$, —$CH_2OH$, —COF, or —$CONH_2$. In contrast, fluorination can reduce such unstable end groups. A fluorinated fluororesin allows the pellets to have much higher fluidity.

The fluororesin preferably contains a small number of unstable end groups or no unstable end group. The total number of the unstable end groups is preferably 120 or less for each $1\times10^6$ carbon atoms.

More preferably, the total number of the above five unstable end groups and —$CF_2H$ end groups, i.e. the total number of —COOH, —$COOCH_3$, —$CH_2OH$, —COF, —$CONH_2$, and —$CF_2H$, in the fluororesin is 120 or less for each $1\times10^6$ carbon atoms. Such a total number within this range can lead to significantly excellent fluidity. If the total number exceeds 120, molding defects may occur. The number of unstable end groups is more preferably 50 or less, still more preferably 20 or less, most preferably 10 or less. The number of unstable end groups herein is a value determined by infrared absorption spectrometry. Neither the unstable end groups nor the —$CF_2H$ end groups may be present, and all the end groups may be —$CF_3$.

The fluorination can be achieved by bringing a non-fluorinated fluororesin into contact with a fluorine-containing compound.

Any fluorine-containing compound may be used, and examples thereof include fluorine radical sources that generate fluorine radicals under fluorination conditions. Examples of the fluorine radical sources include $F_2$ gas, $CoF_3$, $AgF_2$, $UF_6$, $OF_2$, $N_2F_2$, $CF_3OF$, and halogen fluorides (e.g., $IF_5$, $ClF_3$).

The fluorine radical, source such as $F_2$ gas may have a fluorine content of 100%. Still, in order to ensure the safety, it is preferably diluted with inert gas to 5 to 50 mass %, more preferably 15 to 30 mass %. Examples of the inert gas include nitrogen gas, helium gas, and argon gas. From the economic viewpoint, nitrogen gas is preferred.

Any fluorination conditions may be used, and a fluororesin in a molten state may be brought into contact with a fluorine-containing compound. Typically, the fluorination can be performed at a temperature that is not higher than the melting point of the fluororesin, preferably at 20° C. to 220° C., more preferably 100° C. to 200° C. The fluorination is typically performed for 1 to 30 hours, preferably 5 to 25 hours.

The fluorination is preferably achieved by bringing a non-fluorinated fluororesin into contact with fluorine gas ($F_2$ gas).

The fluororesin preferably has a melt flow rate (MFR) of 0.1 to 100 g/10 min. The MFR is more preferably 20 to 100 g/10 min, still more preferably 20 to 60 g/10 min, particularly preferably 35 to 45 g/10 min.

The MFR is a value determined in accordance with ASTM D-1238 or JIS K7210 using a die having a diameter of 2.1 mm and a length of 8 mm at a 5-kg load and 372° C.

The fluororesin preferably has a melting point of 140° C. to 320° C., more preferably 160° C. or higher, still more preferably 200° C. or higher. The melting point is the temperature corresponding to the maximum value on a heat-of-fusion curve obtained at a temperature-increasing rate of 10° C./min using a differential scanning calorimeter (DSC).

The fluororesin is preferably a melt-fabricable fluororesin. The fluororesin is preferably a perfluororesin.

Examples of the fluororesin include tetrafluoroethylene (TFE)/hexafluoropropylene (HFP) copolymers, TFE/perfluoro(alkyl vinyl ether) (PAVE) copolymers, polychlorotrifluoroethylene (PCTFE), and TFE/CTFE/PAVE copolymers.

Examples of the PAVE include perfluoro(methyl vinyl ether) (PMVE), perfluoro (ethyl vinyl ether) (PEVE), and perfluoro(propyl vinyl ether) (PPVE). Preferred is PPVE. One of these or two or more of these may be used.

The fluororesin may further contain a polymerized unit based on an additional monomer in an amount that does not impair the essential characteristics of the fluororesin. The additional monomer may be selected from TFE, HFP, perfluoro(alkyl vinyl ether), perfluoro(alkyl allyl ether) and others as appropriate. The perfluoroalkyl group constituting the additional monomer preferably contains 1 to 10 carbon atoms.

The fluororesin is preferably at least one selected from the group consisting of TFE/HFP copolymers and TFE/PAVE copolymers, more preferably a TFE/HFP copolymer, because they have excellent heat resistance. Two or more of the fluororesins may be used in combination. The fluororesin is also preferably a perfluororesin because it has much better electric properties.

The fluororesin is particularly preferably a copolymer containing 93 to 80 mass % of a TFE unit and 7 to 20 mass % of a HFP unit or a copolymer containing 92 to 75 mass % of a TFE unit, 7 to 20 mass % of a HFP unit, and 0.1 to 5 mass % of a PAVE unit.

The fluororesin can be synthesized by polymerizing a monomer by a common polymerization technique, such as emulsion polymerization, suspension polymerization, solution polymerization, bulk polymerization, or gas-phase polymerization. In the polymerization reaction, a chain-transfer agent such as methanol may be used in some cases. The fluororesin may be produced by polymerization and isolation without a metal-ion-containing reagent.

The fluororesin preferably contains less than 50 ppm of an alkali metal. The amount of the alkali metal is preferably less than about 25 ppm, more preferably less than about 10 ppm, most preferably less than about 5 ppm. The fluororesin obtained by a production method including polymerization and isolation without an alkali metal contains an alkali metal in an amount within the above range.

The amount of the alkali metal is measured by an ashing method. The ashing method is performed as follows. As for elements other than potassium, 2 g of a sample is mixed with 2 g of a 0.2 mass % aqueous solution of potassium sulfate and about 2 g of methanol, and the mixture is heated at 580° C. for 30 minutes so that the resin is burnt out. The residue is washed twice using 20 ml of 0.1 N hydrochloric acid (10 ml×2), and the 0.1 N hydrochloric acid used for the washing is subjected to measurement using an atomic absorption spectrophotometer (Z-8100 polarized Zeeman atomic absorption spectrophotometer, Hitachi High-Technologies Corp.). As for potassium, the ashing method is performed under the same conditions except that the 0.2 mass % aqueous solution of potassium sulfate is replaced by a 0.2 mass % aqueous solution of sodium sulfate.

The pellets may contain any known additives such as fillers and stabilizers.

Examples of the fillers include graphite, carbon fiber, coke, silica, zinc oxide, magnesium oxide, tin oxide, antimony oxide, calcium carbonate, magnesium carbonate, glass, talc, mica, mica, aluminum nitride, calcium phosphate, sericite, diatomite, silicon nitride, fine silica, alumina, zirconia, quartz powder, kaolin, bentonite, and titanium oxide. The fillers may be in any form, such as in the form of fibers, needles, powder, particles, or beads.

The pellets may further contain components such as boron nitride, polyatomic anion-containing inorganic salts, and sulfonic acids and salts thereof. The pellets containing these components can suitably be used for forming a coating layer containing bubbles to be mentioned later.

Examples of the sulfonic acids and salts thereof include $F(CF_2)_nCH_2CH_2SO_3M$ and $F(CF_2)_nSO_3M$, wherein n is an integer of 2 to 12, M is H, $NH_4$, or an alkaline earth metal.

Examples of the polyatomic anion-containing inorganic salts include those disclosed in U.S. Pat. No. 4,764,538 B, and calcium tetraborate is preferred.

The pellets may also contain additives such as fillers (e.g., glass fiber, glass powder, asbestos fiber), reinforcing agents, stabilizers, lubricants, and pigments.

The pellets of the invention can be produced by a production method including melt-molding a fluororesin obtainable by a known polymerization technique. Any molding methods, including any conventionally known methods, may be used. An example is a method in which a fluororesin is melt-extruded using a single-screw extruder, a twin-screw extruder, a tandem extruder, or the like, and then the extrudate is cut into pellets with a predetermined length. The melt-extruding temperature needs to be adjusted depending on the melt viscosity and production method of the fluororesin. The temperature preferably ranges from the melting point of the fluororesin +20° C. to the melting point of the fluororesin +140° C. The fluororesin may be cut by any method, and any conventionally known method may be used, such as a strand cut technique, a hot cut technique, an underwater cut technique, or a sheet cut technique. The resulting pellets may be processed by bringing the pellets into contact with hot water at 30° C. to 200° C., water vapor at 100° C. to 200° C., or hot air at 40° C. to 200° C.

The production method may further include fluorinating the fluororesin. The fluorination may be performed by bringing the pellets obtained by melt-molding into contact with the fluorine-containing compound, by bringing the fluororesin before the melt-molding into contact with the fluorine-containing compound, or by bringing the fluororesin into contact with the fluorine-containing compound multiple times before and after the melt-molding. Thus, the fluororesin to be in contact with the fluorine-containing compound may be in any form, such as powder, flakes, or pellets. Still, the melt-molding may generate the above unstable end group, and thus the fluorination is preferably performed by bringing the pellets obtained by melt-molding into contact with the fluorine-containing compound in consideration of production efficiency and fluidity.

In particular, the shape specific to the invention can be obtained by adjusting factors such as the rate of feeding the materials to an extruder, the rotational speed of a screw, the number of die holes, the diameter of each hole, and the rotational frequency of a cutter. The major axis and minor axis of the pellets can be adjusted by changing the diameter of the holes while maintaining the material feed rate and the number of die holes. The height (thickness) of the pellets can be adjusted by changing the rotational frequency of a cutter while maintaining the material feed rate and the number of die holes.

The pellets may include pellets having an irregular shape, but the number thereof is preferably 100 or less for each 100 g of the pellets.

FIGS. 8 to 11 are pictures of pellets having an irregular shape. The pellets shown in FIG. 8 and FIG. 9 each have a whisker extending from the pellet body, so that the whole shape of each pellet is irregular. The whiskers may drop off the pellet bodies to be pellet scraps when the pellets are transferred from a hopper into a cylinder, possibly preventing formation of a coating layer having good wire diameter stability and capacitance stability.

Figure 10:
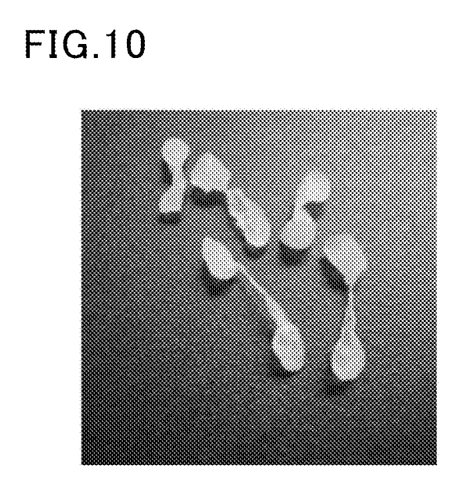
FIG. 10 is a picture of pellets each having an irregular shape.

For the pellets shown in FIG. 10, two or more pieces of fluororesin having a usual pellet size are linked directly or via a whisker to form a mass, so that the whole shape of each pellet is irregular. Pellets having such a shape may prevent smooth transfer from a hopper into a cylinder, and the whiskers may drop off when the pellets are transferred, possibly preventing formation of a coating layer having good wire diameter stability and capacitance stability.

Figure 11:
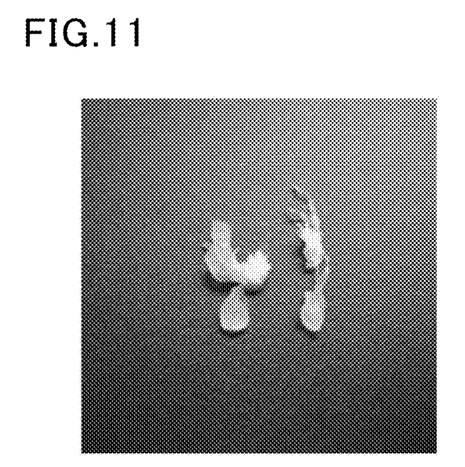
FIG. 11 is a picture of pellets each having an irregular shape.

The pellets shown in FIG. 11 have whiskers, burrs, projections, or other defects, and thus have rough edges, so that the whole shape of each pellet is irregular. Pellets having such a shape may prevent smooth transfer from a hopper into a cylinder, and the whiskers or burrs may drop off when the pellets are transferred, possibly preventing formation of a coating layer having good wire diameter stability and capacitance stability.

The number of pellets having an irregular shape can be determined by randomly selecting 100 g of the pellets and visually counting the number of pellets having an irregular shape.

The pellets may include pellets containing bubbles therein, but the number of such pellets is preferably 10 mass % or less for each 100 g of the pellets. Such pellets are not preferred because they may prevent formation of a coating layer having good wire diameter stability and capacitance stability.

The number of pellets containing bubbles therein can be determined by randomly selecting 100 g of the pellets and visually counting the number of pellets containing bubbles therein.

The pellets having an irregular shape can be reduced by feeding fluororesin powder stably into an extruder during production of the pellets using the extruder, for example.

According to one aspect, the present invention also relates to an electric wire including a core wire and a coating layer disposed around the core wire and formed from the pellets.

The core wire may be formed from a metal conductive material such as copper or aluminum. The core wire preferably has a diameter of 0.02 to 3 mm. The diameter of the core wire is more preferably 0.04 mm or greater, still more preferably 0.05 mm or greater, particularly preferably 0.1 mm or greater. The diameter of the core wire is more preferably 2 mm or smaller.

The coating layer of the electric wire preferably has a thickness of 0.1 to 3.0 mm. The thickness of the coating layer is also preferably 2.0 mm or smaller.

Specific examples of the core wire include American wire gauge No. 46 (AWG-46) (solid copper wire having a diameter of 40 μm), AWG-26 (solid copper wire having a diameter of 404 μm), AWG-24 (solid copper wire having a diameter of 510 μm), and AWG-22 (solid copper wire having a diameter of 635 μm).

The coating layer may contain bubbles, and the bubbles are preferably distributed uniformly in the coating layer.

The bubbles may have any average bubble diameter. The average bubble diameter is preferably 60 μm or smaller, more preferably 45 μm or smaller, still more preferably 35 μm or smaller, further more preferably 30 μm or smaller, particularly preferably 25 μm or smaller, still further more preferably 23 μm or smaller. The average bubble diameter is also preferably 0.1 μm or greater, more preferably 1 μm or greater. The average bubble diameter can be determined by taking an electron micrograph of the cross section of the electric wire, processing the image and calculating the diameter of each bubble, and averaging the diameters.

The coating layer may have an expansion rate of 20% or higher. The expansion rate is more preferably 30% or higher, still more preferably 33% or higher, further more preferably 35% or higher. The upper limit thereof may be any value, and may be 80%, for example. The upper limit of the expansion rate may be 60%.

The expansion rate is a value determined by ((specific gravity of fluororesin)−(specific gravity of coating layer))/(specific gravity of fluororesin)×100. The expansion rate can be adjusted as appropriate in accordance with the intended use by, for example, adjusting the amount of gas introduced in an extruder to be mentioned later or by selecting the type of gas to be dissolved.

The electric wire may further include a different layer between the core wire and the coating layer, and may further include a different layer (outer layer) around the coating layer.

When the coating layer contains bubbles, the electric wire may have a bilayer structure (skin-foam) including a non-foamed layer between the core wire and the coating layer; a bilayer structure (foam-skin) including a non-foamed layer as an outer layer; or a trilayer structure (skin-foam-skin) including a non-foamed layer covering the outer layer of the above skin-foam structure.

The non-foamed layer of the electric wire may be any layer, and may be a resin layer formed from resin such as a TFE/HFP copolymer, a TFE/PAVE copolymer, a TFE/ethylene copolymer, a vinylidene fluoride-based polymer, a polyolefin resin such as polyethylene (PE), or polyvinyl chloride (PVC).

The electric wire may be used as any of cables connecting a computer and its peripheral, such as a LAN cable.

The electric wire may be produced by, for example, a method for producing an electric wire including a core wire and a coating layer using an extruder provided with a cylinder, a screw contained in the cylinder, a die attached to a tip of the cylinder, and a hopper configured to feed pellets into the cylinder, the method including preparing the pellets;
pouring the pellets into the hopper;
feeding the pellets from the hopper to the cylinder;
melting the pellets in the cylinder to form a molten fluororesin; and
extruding the molten fluororesin through e die to form the coating layer on the core wire.

The coating layer containing bubbles can also be formed by introducing gas into the molten fluororesin inside the cylinder. Examples of the gas include chlorodifluoromethane, nitrogen, carbon dioxide, and mixtures of any of these gases. The gas may be introduced as pressurized gas into the molten fluororesin inside the extruder, or may be generated by mixing a chemical blowing agent into the molten fluororesin. The gas dissolves in the molten fluororesin inside the extruder.

EXAMPLES

The invention will be described with reference to examples, but the invention is not limited to these examples.

The parameters in the examples were determined by the following methods.

Example 1

The material used was a dispersion obtained by emulsion polymerization with ammonium persulfate used as a polymerization initiator. The fluororesin contained a tetrafluoroethylene (TFE) unit, a hexafluoropropylene (HFP) unit, and a perfluoro(propyl vinyl ether) ($CF_2$=$CFOC_3F_7$ (PPVE)) unit, and the melting point thereof was 260° C. This fluororesin was coagulated with nitric acid, dehydrated by compression, and dried at 170° C. for four hours.

Then, white powder of this fluororesin was processed into molten pellets using a twin-screw extruder (The Japan Steel Works, Ltd.).

The extruder has a screw diameter of 32 mm and L/D=52.5, and includes a feed zone, a plasticization zone, a vent zone, and a metering zone from the material feeding side. The die has a diameter of 2.5 mm and has four holes. The material was fed at a rate of 15 kg/h with a screw rotational frequency of 200 rpm. The temperature of the polymer extruded from the die was adjusted to 375° C. The rotational frequency of a double blade cutter was 2270 rpm. Thereby, polymer pellets were obtained.

The polymer pellets were further brought into contact with 20 vol % fluorine gas diluted with nitrogen gas at 180° C. for 24 hours.

Measurement of MFR

The MFR was determined using about 6 g of a sample and a melt index tester in conformity with ASTM D1238-98 or JIS K7210 with a die having a diameter of 2.1 mm and a length of 8 mm at 372° C. and a 5-kg load (the sum of a piston and a weight).

Measurement of Melting Point

The melting point was determined from the corresponding peak of a heat-of-fusion curve obtained by thermal analysis at a temperature-increasing rate of 10° C./min using a differential scanning calorimeter RDC220 (Seiko Instruments Inc.) in conformity with ASTM 18-4591.

Measurement of Number of Unstable End Groups

The pellets were rolled using a hydraulic press into a film having a thickness of about 0.3 mm, and this film was analyzed using FT-IR Spectrometer 1760 X (PerkinElmer).

A difference spectrum from a standard sample (a sample sufficiently fluorinated to the extent that the spectra before and after the fluorination show substantially no difference) was obtained and the absorbance of each peak was read. The number of unstable end groups for each $1 \times 10^6$ carbon atoms was calculated by the following formula:

$$\text{Number of unstable end groups for each } 1 \times 10^6 \text{ carbon atoms} = (I \times K)/t$$

(I: absorbance, K: correction coefficient, t: film thickness (unit: mm)).

The correction coefficients (K) of the respective unstable end groups are as follows.
- —COF (1884 $cm^{-1}$): 405
- —COOH (1813 $cm^{-1}$, 1775 $cm^{-1}$): 455
- —COOCH$_3$ (1795 $cm^{-1}$): 355
- —CONH$_2$ (3438 $cm^{-1}$): 480
- —CH$_2$OH (3648 $cm^{-1}$): 2325

Measurement of Number of —CF$_2$H End Groups $^{19}$F-NMR was performed using a nuclear magnetic resonance device AC300 (Bruker BioSpin) at a measurement temperature of the melting point of the fluororesin +20° C. The number of —CF$_2$H end groups was determined from the integrated value of the peaks derived from the presence of —CF$_2$H groups and the integrated value of the other peaks. The sum of the number of the unstable end groups and the number of —CF$_2$H end groups is expressed as "the number of unstable end groups" in Tables 1 to 3.

Measurement of Pellet Diameter

First, 20 g of the resulting pellets were weighed. The major axis and minor axis of each pellet relative to the horizontal surface, and the height from the horizontal surface to the highest point of the pellet were measured with a caliper. The average values of the measured values of the pellets were calculated.

Measurement of Pellet Fluidity

A hopper of an apparent density tester (standard JIS K6891 or 6892) was used. First, 300 g of the resulting pellets were fed into the hopper. The cover of outlet was pulled off, and the period of time until the pellets entirely flowed out was measured. The measurement was performed four times, and the average value thereof was calculated.

Measurement of Number of Pellets with Irregular Shape (PCI)

First, 100 g of the resulting pellets were weighed, and the number of pellets shown below was counted.
1. Pellets with a whisker (FIG. 8 and FIG. 9)
2. Pellets formed of two or more pieces of fluororesin linked together (FIG. 10)
3. Pellets with an irregular shape (FIG. 11)

Measurement of Weight Proportion of Foamed Pellets

First, 100 g of the resulting pellets were weighed. Pellets containing bubbles therein were collected and weighed, and then the weight proportion of the pellets containing bubbles was determined.

Molding of Electric Wire Coating

The wire diameter stability and capacitance stability of an electric wire were evaluated.

Specifically, a single-screw extrusion molding machine (Mitsuba, Mfg. Co., Ltd., cylinder diameter: 20 mm, L/D=24) was prepared and the crosshead thereof was provided with a die having an inner diameter of 3.8 mm and a tip having an outer diameter of 2.3 mm. The core wire used (prepared by twisting together seven tin-plated copper wires having a diameter of 0.064 mm) had an outer diameter of 0.192 mm, and the outer diameter of the resulting electric wire was set to 0.312 mm. The temperature conditions were as follows: cylinder zone C1 (270° C.) cylinder zone C2 (325° C.); cylinder zone C3 (365° C.); neck zone (375° C.); head zone (385° C.); die zone (390° C.) The core-wire pre-heating temperature was set to 200° C. An electric wire was produced with a molten-cone length in molding of 20 mm, and the wire diameter stability and capacitance stability of the electric wire were evaluated.

The wire diameter stability and the capacitance stability were evaluated as follows.

(Wire Diameter Stability)

The outer diameter (OD) was measured along 500 m of the electric wire at a drawing rate of 200 m/min using an outer diameter meter (LS-9006M, Keyence Corp.). The wire diameter stability was calculated as a process capability index (Cp). The Cp value was analyzed from the outer diameter data obtained using NR-500 and NR-HA08 (Keyence Corp.) with the upper limit (USL) set to 0.005 mm higher than the coated electric wire diameter (0.312 mm) and the lower limit (LSL) set to 0.005 mm lower than the coated electric wire diameter.

(Capacitance Stability)

The capacitance was measured for three hours using a capacitance measurement system CAPAC HS (ZUMBACH electronic AG), and the capacitance stability was calculated as a process capability index (Cp). The Cp value was analyzed from the outer diameter data obtained with the upper limit (USL) set to +1.0 (pF/m) and the lower limit (LSL) set to −1.0 (pF/m).

Examples 2 to 5

Pellets were obtained by the same procedure as in Example 1 except that the diameter of the die (die size), the number of die holes, the feed rate, the rotational frequency of the screw, the polymer temperature at the die outlet, and the rotational speed of the cutter blades in pelletization were changed as shown in Table 1, and the molding of electric wire coating was evaluated.

Example 6

Pellets were obtained by the same procedure as in Example 1 except that the amount of ammonium persulfate in emulsion polymerization was changed, and the molding of electric wire coating was evaluated.

Example 7

Pellets were obtained by the same procedure as in Example 1 except that the amount of ammonium persulfate in emulsion polymerization was changed. The molding of electric wire coating was evaluated in the same manner as in Example 1 except that the extrusion temperatures for molding of electric wire coating were changed as follows: cylinder zone C1 (280° C.), cylinder zone C2 (335° C.), cylinder zone C3 (375° C.), neck zone (385° C.), head zone (395° C.), and die zone (400° C.)

Example 8

Pellets were obtained by the same procedure as in Example 1 except that the fluororesin used contained a tetrafluoroethylene (TFE) unit and a hexafluoropropylene (HFP) unit and had a melting point of 256° C. The molding of electric wire coating was evaluated in the same manner as in Example 1 except that the extrusion temperatures for molding of electric wire coating were changed as follows: cylinder zone C1 (290° C.), cylinder zone C2 (345° C.), cylinder zone C3 (385° C.) neck zone (395° C.), head zone (405° C.), and die zone (410° C.)

Example 9

Pellets were obtained by the same procedure as in Example 8 except that the amount of ammonium persulfate in emulsion polymerization was changed. The molding of electric wire coating was evaluated in the same manner as in Example 1 except that the extrusion temperatures for molding of electric wire coating were changed as follows: cylinder zone C1 (280° C.), cylinder zone C2 (335° C.), cylinder zone C3 (375° C.), neck zone (385° C.), head zone (395° C.), and die zone (400° C.)

Example 10

Pellets were obtained under the pelletization conditions shown in Table 1 using a fluororesin containing a tetrafluoroethylene (TFE) unit and a perfluoro (propyl vinyl ether) ($CF_2=CFOC_3F_7$) unit and having a melting point of 300° C. The molding of electric wire coating was evaluated in the same manner as in Example 1 except that the extrusion temperatures for molding of electric wire coating were changed as follows: cylinder zone C1 (280° C.), cylinder zone C2 (335° C.), cylinder zone C3 (375° C.), neck zone (385° C.), head zone (395° C.), and die zone (400° C.)

Comparative Examples 1 to 5

Pellets were obtained by the same procedure as in Example 1 except that the diameter of the die (die size), the number of die holes, the feed rate, the rotational frequency of the screw, the polymer temperature at the die outlet, and the rotational speed of the cutter blades in pelletization were changed as shown in Table 2, and the molding of electric wire coating was evaluated in the same manner as in Example 1.

Comparative Example 6

Pellets were obtained under the pelletization conditions shown in Table 2 with the amount of ammonium persulfate in emulsion polymerization changed. The molding of electric wire coating was evaluated in the same manner as in Example 7.

Comparative Example 7

Pellets were obtained by the same procedure as in Example 8 except that the rotational speed of the cutter blades in pelletization was changed as shown in Table 2, and the molding of electric wire coating was evaluated.

Comparative Example 8

Pellets were obtained by the same procedure as in Example 9 except that the diameter of the die and the rotational speed of the cutter blades in pelletization were changed as shown in Table 2, and the molding of electric wire coating was evaluated.

Comparative Example 9

Pellets were obtained by the same procedure as in Example 10 except that the rotational speed of the cutter blades in pelletization was changed as shown in Table 2, and the molding of electric wire coating was evaluated.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Production conditions | | | | | | | | | | | | |
| Melting point of fluororesin | | ° C. | 260 | 260 | 260 | 260 | 260 | 260 | 260 | 256 | 256 | 300 |
| Pellet extrusion conditions | Die size | mm | 2.5 | 2.1 | 1.5 | 2.5 | 2.5 | 2.5 | 2.5 | 2.5 | 2.5 | 2.5 |
| | Number of die holes | — | 4 | 7 | 20 | 4 | 4 | 4 | 4 | 4 | 4 | 4 |
| | Feed rate | kg/hr | 15 | 15 | 15 | 15 | 15 | 15 | 15 | 15 | 15 | 15 |
| | Rotational frequency of screw | rpm | 200 | 200 | 200 | 200 | 200 | 200 | 200 | 200 | 200 | 200 |
| | Polymer temperature at die outlet | ° C. | 375 | 375 | 375 | 375 | 375 | 375 | 375 | 375 | 375 | 380 |
| | Rotational speed of cutter blades | rpm | 2270 | 2270 | 2240 | 2000 | 2500 | 2270 | 2270 | 2270 | 2270 | 2270 |
| Fluorination | | | Performed | Performed | Performed | Performed | Performed | Performed | Performed | Performed | Performed | Performed |

TABLE 1-continued

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Physical properties of fluororesin |  |  |  |  |  |  |  |  |  |  |  |  |
| Melting point |  | ° C. | 260 | 260 | 260 | 260 | 260 | 260 | 260 | 256 | 256 | 300 |
| MFR |  | g/10 min | 36 | 36 | 36 | 36 | 36 | 42 | 25 | 6 | 25 | 30 |
| Number of unstable end groups |  | Groups | 0 | 1 | 2 | 3 | 0 | 0 | 0 | 10 | 15 | 0 |
| Evaluation of pellets |  |  |  |  |  |  |  |  |  |  |  |  |
| Pellets | Major axis $D_1$ | mm | 2.9 | 2.4 | 1.7 | 2.9 | 2.9 | 2.9 | 2.9 | 2.9 | 2.9 | 2.9 |
|  | Minor axis $D_2$ | mm | 2.9 | 2.4 | 1.7 | 2.9 | 2.9 | 2.9 | 2.9 | 2.9 | 2.9 | 2.9 |
|  | Height (thickness) L | mm | 1.3 | 1.1 | 0.8 | 1.5 | 1.2 | 1.3 | 1.3 | 1.3 | 1.3 | 1.3 |
|  | $(D_1 + D_2)/2 L$ | — | 2.2 | 2.2 | 2.2 | 1.9 | 2.4 | 2.2 | 2.2 | 2.2 | 2.2 | 2.2 |
|  | Height (thickness) (deviation) | mm | 0.15 | 0.13 | 0.11 | 0.16 | 0.15 | 0.15 | 0.15 | 0.15 | 0.15 | 0.15 |
| PCI |  | pcs/100 g | 2 | 6 | 15 | 15 | 15 | 2 | 7 | 2 | 2 | 2 |
| Weight proportion of foamed pellets |  | mass % | 3 | 4 | 4 | 2 | 5 | 3 | 3 | 3 | 3 | 3 |
| Result of pellet fluidity test |  | sec | 8.6 | 8.1 | 7.9 | 8.9 | 8.9 | 8.6 | 8.5 | 8.5 | 8.6 | 8.8 |
| Evaluation of molding of electric wire coating |  |  |  |  |  |  |  |  |  |  |  |  |
| Wire diameter stability | Cp value | — | 1.30 | 1.48 | 1.52 | 1.16 | 1.12 | 1.33 | 1.38 | 1.35 | 1.32 | 1.21 |
| Capacitance stability | Cp value | — | 1.31 | 1.50 | 1.62 | 1.20 | 1.14 | 1.36 | 1.40 | 1.37 | 1.33 | 1.28 |

TABLE 2

|  |  |  | Comparative Example 1 | Comparative Example 2 | Comparative Example 3 | Comparative Example 4 | Comparative Example 5 |
|---|---|---|---|---|---|---|---|
| Production conditions |  |  |  |  |  |  |  |
| Melting point of fluororesin |  | ° C. | 260 | 260 | 260 | 260 | 260 |
| Pellet extrusion conditions | Die size | mm | 3.0 | 2.5 | 2.5 | 2.5 | 2.5 |
|  | Number of die holes | — | 4 | 4 | 4 | 4 | 4 |
|  | Feed rate | kg/hr | 15 | 15 | 25 | 15 | 23 |
|  | Rotational frequency of screw | rpm | 200 | 200 | 200 | 200 | 200 |
|  | Polymer temperature at die outlet | ° C. | 375 | 375 | 375 | 375 | 385 |
|  | Rotational speed of cutter blades | rpm | 1285 | 1660 | 2780 | 1660 | 3000 |
| Fluorination |  |  | Performed | Performed | Performed | Performed | Performed |
| Physical properties of fluorcresin |  |  |  |  |  |  |  |
| Melting point |  | ° C. | 260 | 260 | 260 | 260 | 260 |
| MFR |  | g/10 min | 35 | 36 | 36 | 38 | 38 |
| Number of unstable end groups |  | Groups | 0 | 0 | 0 | 0 | 0 |
| Evaluation of pellets |  |  |  |  |  |  |  |
| Pellets | Major axis $D_1$ | mm | 3.5 | 2.9 | 2.9 | 2.9 | 2.9 |
|  | Minor axis $D_2$ | mm | 3.5 | 2.9 | 2.9 | 2.9 | 2.9 |
|  | Height (thickness) L | mm | 1.6 | 1.8 | 1.8 | 1.8 | 2.0 |
|  | $(D_1 + D_2)/2 L$ | — | 2.2 | 1.6 | 1.6 | 1.6 | 1.5 |
|  | Height (thickness) (deviation) | mm | 0.16 | 0.19 | 0.19 | 0.35 | 0.37 |

TABLE 2-continued

|  |  | | | | |
|---|---|---|---|---|---|
| PCI | pcs/100 g | 3 | 2 | 120 | 2 | 0 |
| Weight proportion of foamed pellets | mass % | 2 | 3 | 3 | 3 | 40 |
| Result of pellet fluidity test | sec | 9.5 | 9.3 | 10.2 | 9.4 | 9.4 |
| Evaluation of molding of electric wire coating |  |  |  |  |  |  |
| Wire diameter stability | Cp value | — | 0.97 | 1.09 | 0.86 | 1.05 | 1.05 |
| Capacitance stability | Cp value | — | 0.92 | 1.10 | 0.80 | 1.08 | 1.08 |

|  |  |  | Comparative Example 6 | Comparative Example 7 | Comparative Example 8 | Comparative Example 9 |
|---|---|---|---|---|---|---|
| Production conditions |  |  |  |  |  |  |
| Melting point of fluoraresin |  |  | 260 | 256 | 256 | 300 |
| Pellet extrusion conditions | Die size |  | 2.8 | 2.5 | 2.8 | 2.5 |
|  | Number of die holes |  | 4 | 4 | 4 | 4 |
|  | Feed rate |  | 15 | 15 | 15 | 15 |
|  | Rotational frequency of screw |  | 200 | 200 | 200 | 200 |
|  | Polymer temperature at die outlet |  | 375 | 375 | 375 | 380 |
|  | Rotational speed of cutter blades |  | 2090 | 3300 | 2100 | 3190 |
| Fluorination |  |  | Performed | Performed | Performed | Performed |
| Physical properties of fluororesin |  |  |  |  |  |  |
| Melting point |  |  | 260 | 256 | 256 | 300 |
| MFR |  |  | 30 | 6 | 28 | 30 |
| Number of unstable end groups |  |  | 25 | 10 | 10 | 0 |
| Evaluation of pellets |  |  |  |  |  |  |
| Pellets | Major axis $D_1$ |  | 3.2 | 2.9 | 3.3 | 2.S |
|  | Minor axis $D_2$ |  | 3.2 | 2.9 | 3.3 | 2.9 |
|  | Height (thickness) L |  | 1.2 | 0.9 | 1.1 | 0.9 |
|  | $(D_1 + D_2)/2$ L |  | 2.7 | 3.2 | 3.0 | 3.1 |
|  | Height (thickness) (deviation) |  | 0.21 | 0.17 | 0.17 | 0.14 |
| PCI |  |  | 0 | 0 | 0 | 20 |
| Weight proportion of foamed pellets |  |  | 3 | 3 | 6 | 10 |
| Result of pellet fluidity test |  |  | 9.4 | 10.3 | 9.5 | 10.1 |
| Evaluation of molding of electric wire coating |  |  |  |  |  |  |
| Wire diameter stability | Cp value |  | 1.05 | 0.85 | 0.99 | 0.30 |
| Capacitance stability | Cp value |  | 1.09 | 0.83 | 0.95 | 0.85 |

Example 11

Pellets were obtained by the same procedure as in Example 1 except that the fluorination was not performed, and the molding of electric wire coating was evaluated. The results are shown in Table 3.

TABLE 3

| | | | Example 11 |
|---|---|---|---|
| Production conditions | | | |
| Melting point of fluororesin | | °C. | 260 |
| Pellet extrusion conditions | Die size | mm | 2.5 |
| | Number of die holes | — | 4 |
| | Feed rate | kg/hr | 15 |
| | Rotational frequency of screw | rpm | 200 |
| | Polymer temperature at die outlet | °C. | 375 |
| | Rotational speed of cutter blades | rpm | 2270 |
| Fluorination | | | Not performed |
| Physical properties of fluororesin | | | |
| Melting point | | °C. | 260 |
| MFR | | g/10 min | 36 |
| Number of unstable end groups | | Groups | 580 |
| Evaluation of pellets | | | |
| Pellets | Major axis $D_1$ | mm | 3.0 |
| | Minor axis $D_2$ | mm | 3.0 |
| | Height (thickness) L | mm | 1.4 |
| | $(D_1 + D_2)/2 L$ | — | 2.2 |
| | Height (thickness) (deviation) | mm | 0.10 |
| PCI | | pcs/100 g | 2 |
| Weight proportion of foamed pellets | | mass % | 3 |
| Result of pellet fluidity test | | sec | 9.2 |
| Evaluation of molding of electric wire coating | | | |
| Wire diameter stability | Cp value | — | 1.10 |
| Capacitance stability | Cp value | — | 1.11 |

REFERENCE SIGNS LIST

11, 12: pellets

The invention claimed is:

1. Pellets comprising a fluororesin,
each of the pellets, placed on a horizontal surface, having a circular outline and having a major axis $D_1$ of 1.6 to 3.1 mm and a minor axis $D_2$ of 1.6 to 3.1 mm when observed in the direction normal to the horizontal surface, and satisfying the following formula (1):

$(D_1+D_2)/2L=1.8$ to $2.6$ wherein $D_1$ represents the major axis, $D_2$ represents the minor axis, and L represents the height from the horizontal surface to the highest point of the pellet.

2. The pellets according to claim 1,
wherein the heights L have a standard deviation of 0.3 mm or smaller.

3. The pellets according to claim 1,
wherein the pellets include 10 mass % or less of pellets containing bubbles therein for each 100 g of the pellets.

4. The pellets according to claim 1,
wherein 300 g of the pellets are able to be discharged within 9.2 seconds in a pellet fluidity test using a hopper of an apparent density tester as specified in JIS K6891 or 6892.

5. The pellets according to claim 1,
wherein each pellet has a spheroidal shape, or a cylindrical shape.

6. The pellets according to claim 1,
wherein the fluororesin contains 120 or less groups in total selected from —COOH, —COOCH$_3$, —CH$_2$OH, —COF, —CONH$_2$, and —CF$_2$H for each $1\times10^6$ carbon atoms.

7. A method for producing an electric wire including a core wire and a coating layer using an extruder provided with a cylinder, a screw contained in the cylinder, a die attached to a tip of the cylinder, and a hopper configured to feed pellets into the cylinder, the method comprising:
preparing the pellets according to claim 1;
pouring the pellets into the hopper;
feeding the pellets from the hopper into the cylinder;
melting the pellets in the cylinder to form a molten fluororesin; and
extruding the molten fluororesin through the die to form the coating layer on the core wire.

8. Pellets comprising a fluororesin, the pellets including not more than 100 pellets having an irregular shape for each 100 g of the pellets and, placed on a horizontal surface, having a circular outline and having a major axis $D_1$ of 1.6 to 3.1 mm and a minor axis $D_2$ of 1.6 to 3.1 mm when observed in the direction normal to the horizontal surface, and satisfying the following formula (1):

$(D_1+D_2)/2L=1.8$ to $2.6$ wherein $D_1$ represents the major axis, $D_2$ represents the minor axis, and L represents the height from the horizontal surface to the highest point of the pellet,
wherein the pellets having an irregular shape are selected from the group consisting of pellets having a whisker, pellets linked directly or via a whisker, pellets having burrs, pellets having projections and pellets having rough edges.

* * * * *